(12) United States Patent
Rood et al.

(10) Patent No.: US 8,500,853 B2
(45) Date of Patent: Aug. 6, 2013

(54) GAS PURIFICATION SYSTEM AND METHOD FOR LIQUEFACTION OF DILUTE GAS COMPONENTS

(75) Inventors: Mark J. Rood, Champaign, IL (US); K. James Hay, Mahomet, IL (US); David Johnsen, Downers Grove, IL (US); Kaitlin Mallouk, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 201 days.

(21) Appl. No.: 12/827,630

(22) Filed: Jun. 30, 2010

(65) Prior Publication Data

US 2011/0132031 A1 Jun. 9, 2011

Related U.S. Application Data

(60) Provisional application No. 61/266,789, filed on Dec. 4, 2009.

(51) Int. Cl.
*B01D 53/02* (2006.01)

(52) U.S. Cl.
USPC .......... 95/115; 95/143; 95/148; 96/126; 96/130; 96/146; 62/606

(58) Field of Classification Search
USPC .......... 62/606; 95/115, 143, 148; 96/126, 96/130, 146
See application file for complete search history.

(56) References Cited

U.S. PATENT DOCUMENTS

| | | | | |
|---|---|---|---|---|
| 3,176,444 A | * | 4/1965 | Kiyonaga | 95/96 |
| 3,963,460 A | * | 6/1976 | Stumpf et al. | 95/127 |
| 4,043,770 A | * | 8/1977 | Jakob | 95/93 |
| 4,317,808 A | * | 3/1982 | Voigt et al. | 423/375 |
| 4,537,760 A | * | 8/1985 | Lavie | 423/359 |
| 4,624,841 A | * | 11/1986 | Hidaki | 423/359 |

(Continued)

FOREIGN PATENT DOCUMENTS

WO  WO 2007133602 A2 * 11/2007

OTHER PUBLICATIONS

Emamipour, H., et al., Steady-State and Dynamic Desorption of Organic Vapor from Activated Carbon with Electrothermal Swing Adsorption. *Environ. Sci. Technol.* 2007, 41, 5063-5069.

(Continued)

*Primary Examiner* — Christopher P Jones
(74) *Attorney, Agent, or Firm* — Greer, Burns & Crain Ltd.

(57) ABSTRACT

The invention provides gas purification methods and systems for the recovery and liquefaction of low boiling point organic and inorganic gases, such as methane, propane, $CO_2$, $NH_3$, and chlorofluorocarbons. Many such gases are in the effluent gas of industrial processes and the invention can increase the sustainability and economics of such industrial processes. In a preferred method of the invention, low boiling point gases are adsorbed with a heated activated carbon fiber material maintained at an adsorption temperature during an adsorption cycle. During a low boiling point desorption cycle the activated carbon fiber is heated to a desorption temperature to create a desorption gas stream with concentrated low boiling point gases. The desorption gas stream is actively compressed and/or cooled to condense and liquefy the low boiling point gases, which can then be collected, stored, re-used, sold, etc. Systems of the invention include an active condensation loop that actively cools and/or compresses a desorption gas stream from said vessel to liquefy low boiling point gases.

19 Claims, 12 Drawing Sheets

U.S. PATENT DOCUMENTS

| | | | | |
|---|---|---|---|---|
| 4,718,240 | A * | 1/1988 | Andeen et al. | 62/55.5 |
| 4,784,672 | A * | 11/1988 | Sircar | 95/97 |
| 4,831,208 | A * | 5/1989 | Zarchy | 585/737 |
| 4,846,852 | A * | 7/1989 | Schweitzer et al. | 95/125 |
| 5,000,925 | A * | 3/1991 | Krishnamurthy et al. | 48/61 |
| 5,110,328 | A * | 5/1992 | Yokota et al. | 96/112 |
| 5,125,935 | A * | 6/1992 | Nakaya et al. | 95/98 |
| 5,230,877 | A * | 7/1993 | Eimer et al. | 423/359 |
| 5,308,457 | A * | 5/1994 | Dalla Betta et al. | 95/143 |
| 5,388,637 | A * | 2/1995 | Jones et al. | 165/104.12 |
| 5,567,229 | A | 10/1996 | Klobucar et al. | |
| 5,746,788 | A * | 5/1998 | Schmidt et al. | 48/198.2 |
| 5,912,423 | A * | 6/1999 | Doughty et al. | 95/107 |
| 5,912,424 | A * | 6/1999 | Judkins et al. | 95/143 |
| 5,968,232 | A * | 10/1999 | Whitlock | 95/90 |
| 6,315,977 | B1 * | 11/2001 | Cantacuzene | 423/651 |
| 6,322,356 | B1 | 11/2001 | Gupta et al. | |
| 6,364,936 | B1 | 4/2002 | Rood et al. | |
| 6,527,836 | B1 | 3/2003 | White et al. | |
| 6,613,126 | B2 * | 9/2003 | Tange et al. | 95/95 |
| 6,660,063 | B2 | 12/2003 | Tom et al. | |
| 6,726,746 | B2 * | 4/2004 | Dai et al. | 95/115 |
| 6,764,670 | B2 * | 7/2004 | Henderson | 423/469 |
| 7,316,731 | B2 * | 1/2008 | Farant et al. | 95/106 |
| 2005/0139546 | A1 | 6/2005 | Burke | |
| 2008/0184886 | A1 * | 8/2008 | Tufts et al. | 95/148 |
| 2009/0293725 | A1 | 12/2009 | Rood et al. | |

OTHER PUBLICATIONS

Hashisho, Z., et al., Rapid Response Concentration-Controlled Desorption of Activated Carbon to Dampen Concentration Fluctuations, *Environ. Sci. Technol.* 2007, 41, 1753-1758.

Kolade, M. A.; et. al., Adsorptive reactor technology for VOC abatement. *Chemical Engineering Science* 2009, 64 (6), 1167-1177.

McIntyre, J.A.; et.al., High Enrichment and Recovery of Dilute Hydrocarbons by DualReflux Pressure-Swing Adsorption. *Industrial Chemical Engineering Research*, 2002.41.3499-3604.

Nitsche, V.: et. al., Separation of organic vapors by means of membranes. *Chemical Engineering & Technology* 1998,21 (12), 925-935.

Subrenat, A. S.; et. al., Volatile organic compound (VOC) removal by adsorption onto activated carbon fiber cloth and electrothermal desorption: An industrial application. *Chemical Engineering Communications* 2006, 193 (4), 478-486.

Sullivan, P. D.; et.al., Capture of organic vapors using adsorption and electrothermal regeneration. *Journal of Environmental Engineering—ASCE* 2004, 130 (3),258-267.

Sullivan, P. D.; et. al, Activated carbon fiber cloth electrothermal swing adsorption system. *Environmental Science & Technology* 2004,38 (18), 4865-4877.

Sullivan, P. D.; et. al., Adsorption and electrothermal desorption of hazardous organic vapors. *Journal of Environmental Engineering—ASCE* 2001,127 (3),217-223.

* cited by examiner

GAS PURIFICATION SYSTEM AND METHOD FOR LIQUEFACTION OF DILUTE GAS COMPONENTS

CLAIM FOR PRIORITY AND REFERENCE TO RELATED APPLICATION

This application claims priority from prior provisional, application Ser. No. 61/266,789, which was filed on Dec. 4, 2009 and entitled Gas Purification Device and Method for Liquefaction of Dilute Gas Components.

BACKGROUND

Rood et al. U.S. Pat. No. 6,364,936 provides for selective sorption and desorption of gases with electrically heated activated carbon fiber cloth element. In the '936 patent, an adsorption/desorption unit includes a hollow enclosure containing one or more elongated hollow elements of activated carbon fiber cloth (ACFC) of appropriate length to cross sectional area to provide suitable electrical resistance for heating. The elements conduct electrical current to heat to a temperature that permits selective adsorption of a gas stream constituent and subsequent desorption to recover sorbate. An enclosure houses the ACFC elements and is arranged to direct gas stream flow through the elements and into and out of the enclosure via gas ports. The ability to heat the elements to a desired temperature by electrical current flow allows for straightforward implementation of selective adsorption. After an adsorption step, altering the temperature of the element or elements enables desorption. In a particularly preferred embodiment, the enclosure with the element also includes a liquid, condensate outlet and liquid sorbate is directly recovered as liquid from the same unit used for adsorption and desorption.

Rood et al. U.S. Patent Application 20090293725 provides a steady state tracking desorption system and method. In the '725 application, a steady state tracking desorption system achieves steady tracking of either a fixed sorbate output set point, or a set point that changes over time. The system includes an electrically heated thermal adsorption/desorption device. A temperature sensor senses the temperature of an adsorbent material within the adsorption/desorption device. A sorbate sensor senses a sorbate concentration from an outlet of the adsorption/desorption device. A power sensor senses the power supplied by the desorption device. A controller interprets levels sensed by the temperature sensor, the sorbate sensor and the power sensor and provides a signal to achieve steady set point tracking of a sorbate concentration from the outlet of the adsorption/desorption device.

There are several industrial processes that use or produce difficult to capture organic and inorganic gases. These organic and inorganic gases are often inert components of the gas streams of various manufacturing processes. They are typically present at low concentration in the effluent gas streams of the manufacturing processes. Due to these low concentrations, the organic gases are typically not reused in the process and are instead captured downstream or disposed of via a thermal oxidizer.

SUMMARY OF THE INVENTION

The invention provides gas purification methods and systems for the recovery and liquefaction of low boiling point inorganic and organic gases, such as $CO_2$, $NH_3$, chlorofluorocarbons, methane, and propane. Many such gases are in the effluent gas of industrial processes and the invention can increase the sustainability and economics of such industrial processes. In a preferred method of the invention, low boiling point gases are adsorbed with activated carbon fiber material during an adsorption cycle. During a desorption cycle, the activated carbon fiber is heated to a temperature to regenerate the fibers and generate a gas stream enriched with the low boiling point gases. This desorption gas stream is actively compressed and/or cooled to condense and liquefy the low boiling point gases, which can then be collected, stored, re-used, sold, etc. Systems of the invention include an active condensation loop that actively cools and/or compresses a desorption gas stream from said vessel to liquefy low boiling point gases.

DETAILED DESCRIPTION OF THE PREFERRED EMBODIMENTS

Figure 1A:
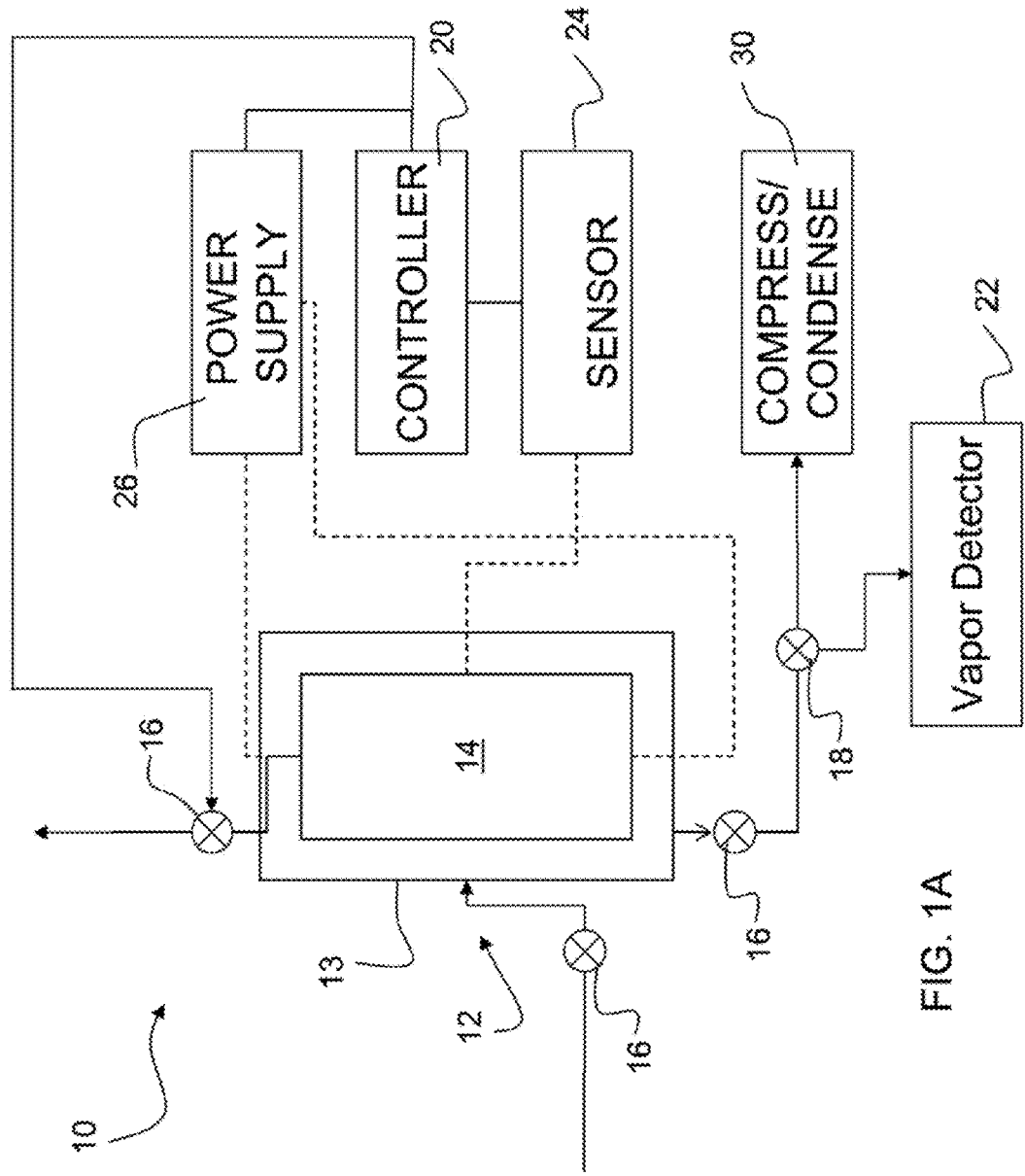
FIG. 1A is a schematic diagram of a preferred embodiment dilute gas component gas purification desorption system of the invention that has a single vessel for adsorption/desorption.

The ability to capture, concentrate, and reuse the low boiling point (less than about 40° C.) organic gases (e.g., methane, propane) and inorganic gases (e.g., $CO_2$, $NH_3$, chlorofluorocarbons) and that are in the effluent gas of many industrial processes will increase the sustainability and economics of such industrial processes. Embodiments of the invention provide methods and systems for gas purification and for the liquefaction of such dilute low boiling point gas components. Methods and system of the invention will have many applications and can provide great environmental benefits. An example application is to a packaging plant. Difficult to capture low boiling point inorganic and organic gases are captured via methods and systems of the invention and can be re-used in the manufacturing process or sequestered if desired. Other example industrial processes include oil refining, power production, and refrigeration systems.

Methods and systems of the invention can capture dilute and concentrated concentrations of low boiling point inorganic and organic gases that are present in many industrial processes. An example low boiling point gas is isobutane, which is important in the production of packaging materials. The invention also provides the ability to concentrate and then recycle the low boiling point gases for use in the industrial process to which the invention is applied. Recycling and using the dilute gases from the effluent stream is of tremendous environmental benefit as it avoids the need for thermal distribution of the dilute gases in the effluent stream. Additionally, recycling offers a potential cost benefit, associated both with the avoidance of the cost of thermal destruction (including mitigation of resultant green house gas and ozone precursors), and with the reduced need for raw material for input to the system.

Methods and systems of the invention can capture $CO_2$. Identified as a potential greenhouse gas, many governments and industries have interest in capturing carbon dioxide to reduce the amount of emission into the atmosphere.

Methods and systems of the invention make use of an ACFC desorber device that can have its adsorption and desorption cycles occur with electrothermal swing adsorption and with precise control. Preferred embodiments use a gas phase sorbate output ACFC cartridge desorber device disclosed in U.S. Pat. No. 6,364,936. Other types of adsorbents that can be electrically heated can also be used in systems of the invention, e.g., beads and monoliths. Example additional materials are disclosed in "Adsorption and Electrothermal Desorption of Organic Vapors Using Activated Carbon Adsorbents with Novel Morphologies", Luo et al., Carbon, 44, 2715-2723, (2006). Other examples include activated carbons such as monolith, beads and fiber cloths that can effectively capture organic vapors and be electrically heated (e.g., by electrical resistance or microwave heating).

Particular preferred systems and methods will now be discussed with respect to the drawings. Schematic representations will be understood by artisans. From the particular preferred embodiments, artisans will appreciate broader aspects of the invention and will also recognize variations and additional embodiments.

Referring now to FIG. 1A, a preferred embodiment dilute gas component gas purification desorption system 10 is shown. The system 10 includes an electrically heated ACFC desorber device 12, which can include one or more ACFC cartridges housed in a vessel 13. Heating is accomplished electrically, such as by electrical resistance heating or electrical microwave heating. A single cartridge 14 is illustrated in FIG. 1A for simplicity of illustration, though a single cartridge or multiple cartridge vessel can also be used in practice. Valve 16 control gas flows into and out of the desorber device 12. An additional valve 18 provides output gas vapor samples to a vapor detector 22, which determines sorbate concentration. The sorbate concentration data are available to a controller 20. The controller 20 also receives data from a sensor 24 that monitors the temperature of the ACFC cartridge 14. A temperature sensor can be used, but in preferred embodiments the sensor 24 monitors the resistance of the ACFC and the controller 20 determines temperature from the resistance. This simplifies feedback control. Either the concentration data or temperature data are used by the controller 20 to set and continue to adjust power output of a power supply 26 that provides power to heat the ACFC cartridge 14. While the controller 20, sensor 24 and power supply 26 are illustrated in the schematic diagram as separate units, in practice they can be a single unit and integral to the vessel 13. In practice, the controller 20 can be realized, for example, as internal logic/software in a control system for the vessel 13 or the overall system. Optionally, the power can be adjusted, as needed to maintain an appropriate steady-state sorbate concentration in an output gas stream $D_{out}$, as disclosed in Rood et al. U.S. Patent Application 20090293725. However, in preferred embodiments, the vapor detector 22 and the steady state control are omitted. If the steady-state control is desired and implemented, then that aspect of the present system of FIG. 1A generally works as Rood et al. U.S. Patent Application 20090293725, with the ACFC cartridge 14 being controlled to selectively adsorb organic gases from an air stream and provide the adsorbate at a carefully controlled concentration equal to its set-point concentration during regeneration of the ACFC.

However, the system of FIG. 1A also includes a compression and condensation system 30 that is used to capture low boiling point gases, which is implemented in preferred embodiments without steady-state control. The compression and condensation system 30 in preferred embodiments is controlled to accomplish refrigeration cycles that run continuously for a continuously operating gas recovery system. Specifically, the system 30 takes a gas stream generated during a regeneration cycle, compresses and cools it to liquefy the low boiling point gas components. The controller 20, temperature sensor and power supply are illustrated separately from the desorber device 12, but can be part of an integrated construction with the device. The vessel 13 can be constructed as in Rood et al. U.S. Pat. No. 6,364,936, or as in Rood et al. U.S. Patent Application 20090293725, both of which are incorporated by reference herein.

The preferred desorber device 12 preferably has a rigid enclosure 13 that allows for temperature of the walls of the vessel and/or pressure/temperature control of the internal volume of the vessel to promote capture and recovery of gases as liquids by condensation along the walls of the enclosure which could be drained out the bottom of the enclosure 13 during desorption or to provide pressure/temperature control downstream of the desorber vessel to condense the concentrated gases. The ACFC cartridge 14 is configured to allow for fluid flow to permit carrier gas penetration while also having electrical resistance to permit electrical heating for desorption cycles. The well known relationship between length, cross section, and material properties determines electrical resistance of an individual ACFC element of the invention or a series combination of such elements.

It is also important to note that the compression and/or condensation system can be implemented as a separate vessel or can be implemented as part of the desorber device. An alternative to compressing and cooling the desorption stream downstream of the desorption vessel 13 is to modify the atmosphere within the vessel by pressurizing and/or chilling it during adsorption and/or desorption cycles. The gas initially sorbs to the sorbent during the adsorption cycle and then desorbs from the sorbent by heating of the adsorbent, which may or may not be aided by flow of an inert gas. Pressure and temperature can be selected according the particular low boiling point gases that are captured and desorbed and the temperature and pressure conditions with active cooling/compressing of the desorption vessel 13 itself can allow the desorbed compound to reach its saturation pressure and temperature inside the desorption vessel 13, resulting in more readily achievable condensation of the desorbed compound during the desorption cycle. If active compression and/or cooling is implemented as part of the desorber device, the construction should attempt to minimize harm to the ACFC cartridge 14 during compression and cooling cycles. The sorbent and vessel are also designed to allow for selective Joule heating of the sorbent to desorb the gas and selective cooling of the gas near the walls of the vessel to liquefy the desorbed component and allow the liquid to flow out of the device by gravity during regeneration cycles. An inert carrier gas may or may not be used to assist with the flow of the desorbed material away from the sorbent. Either or both of compression and cooling can be used in the compression and/or condensation system 30. For condensation without compression, a temperature of about −11° C. is sufficient to achieve the condensation (dew) point of many organic gases of interest, for example isobutane's dew point temperature is −11.7° C. This temperature assumes that a pure organic gas is being desorbed. If desorption has an organic gas mixed with nitrogen, then lower temperatures should be used (e.g., −28° C. for a 50% isobutane/50% nitrogen mixture). Other gases, like propane also have lower dew points (−42° C.). With compression, condensation can be achieved at higher temperatures.

Generally, low boiling point gases can be captured and liquefied with the invention, so long as the gases can be adsorbed by ACFC. Example gases that are usefully captured by the invention include the low boiling point gases shown in Table 1 below.

TABLE 1

| Compound | $T_{bp}$ (° C.) |
|---|---|
| Methylene Chloride | 39.8 |
| Pentane | 36 |
| Cyclobutane | 13 |
| Isobutane | −11.7 |
| Propane | −42.1 |
| $CO_2$ | −57.0 |

Figure 1B:
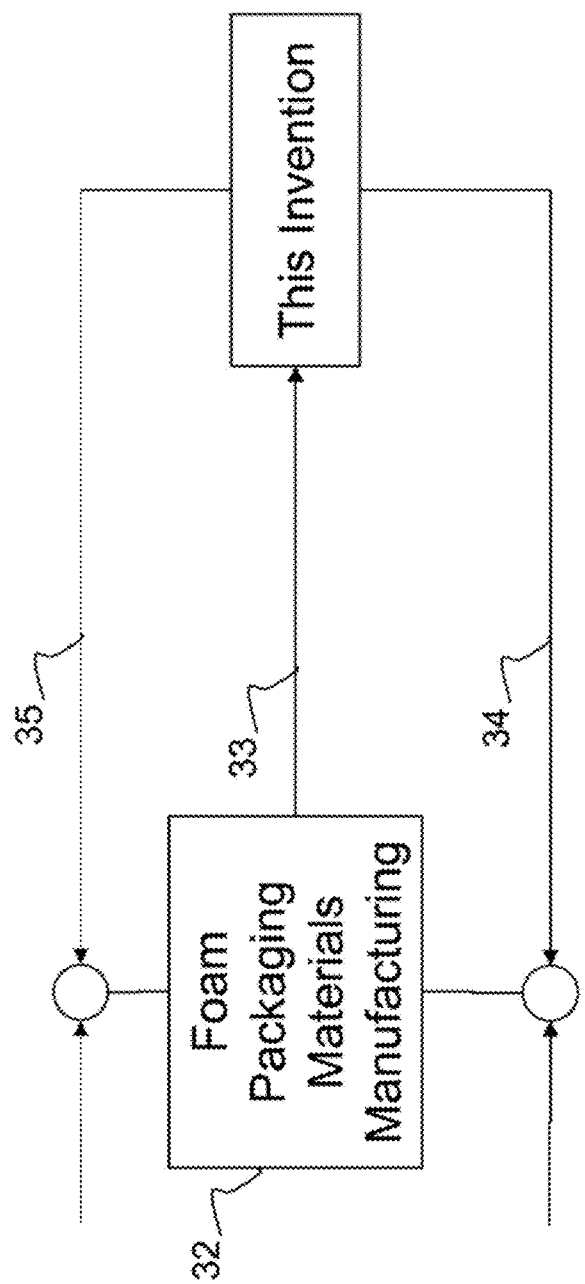
FIG. 1B is a schematic diagram of a preferred manufacturing system including a dilute gas component gas purification desorption system of the invention.

FIG. 1B shows a manufacturing system of the invention. In the system of FIG. 1B, a foam materials packaging manufacturing plant 32 requires a supply of liquid isobutane in addition to treated air. An output gas stream 33 includes air and byproducts, including quantities of low boiling point isobutane gas (e.g., 2,000 ppm$_v$). Preferably, the output gas stream is treated to remove particulate matter. The system of the invention returns liquefied isobutane, 34, and purified air, 35, reducing the demand of the system 32 for liquid isobutane feedstock and purified air.

Figure 2:
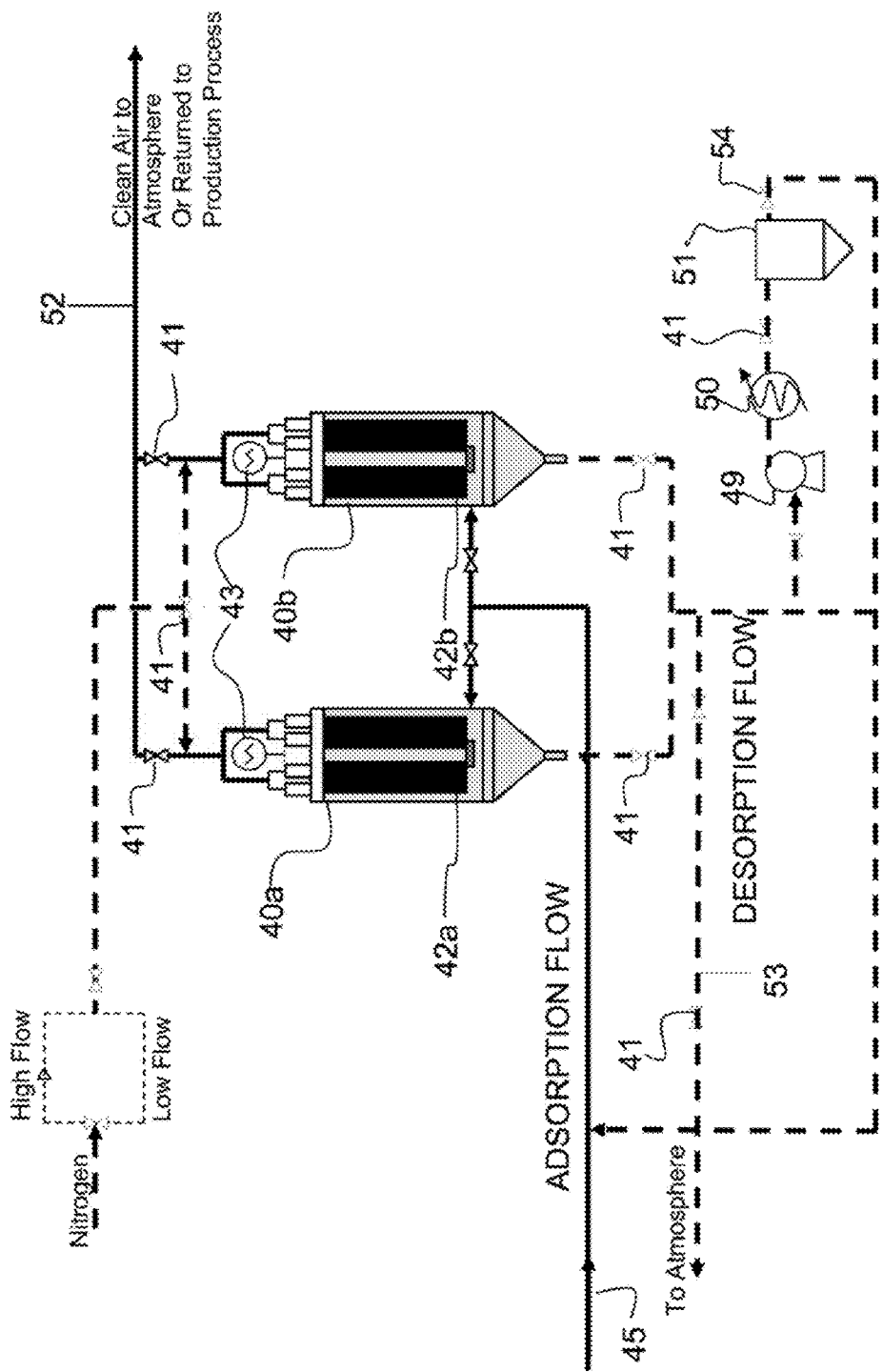
FIG. 2 is a schematic diagram of another preferred embodiment dilute gas component gas purification desorption system having a plurality of vessels for adsorption/desorption.

FIG. 2 shows a preferred embodiment system that includes multiple vessels 40a, 40b that allow simultaneous adsorption and desorption operations to be conducted. In FIG. 2, adsorption flow paths are shown with solid lines and desorption flow paths with dashed lines, both of which are controlled with a number of automated valves 41. The system can be controlled, for example, with valves and temperature controls such that Vessel 1 40a adsorbs dilute concentrations of organic gas, e.g., <5,000 ppmv, from an air stream into ACFC cartridges 42a while ACFC cartridges 42b in vessel 2 desorb concentrated organic gas into $N_2$ using electrothermal heating supplied by electric current from supply/controller 43 flowing through the ACFC resulting in Joule heating. Adsorption and desorption cycles alternate between the vessels 40a and 40b allowing for continuous capture and recovery of the organic gas. The desorbed gas stream can range from about <50 ppm$_v$ to >90% organic gas by volume. The FIG. 2 system is controlled, preferably, with a feedback controller as part of the supply/controller 43 that achieves a constant organic and/or inorganic gas temperature during desorption and can regenerate the ACFC under carefully controlled conditions without requiring the direct measurement of the ACFC's temperature, to simplify the system.

The system of FIG. 2 receives a gas stream 45 comprising gas and organic components from a plant or system that produces a feed gas of dry, filtered air with a controlled amount of organic gas. The gas stream 45 can be pre-treated, such as with pressurized house air that is passed through a High Efficiency Particulate Air (HEPA) filter and then through a vessel of silica gel to ensure it is free of particulate matter. Temperature of the ACFC in cartridges 42a and 42b can be monitored via temperature sensing by the supply/controller as described with respect to FIG. 1A, and the inside vessel walls can also optionally include a temperature sensor that can be monitored by the supply/controller 43. Power is supplied to the ACFC for electrical heating via the supply/controller 43. A compressor 49 compresses a desorption gas stream (which is a fraction of the flow and volume of the initial gas stream that is treated during adsorption cycles) and with a heat exchanger 50 condenses out low boiling point organic and inorganic gases that are not effectively condensed from the ACFC vessels 40a, 40B. The condensed low boiling point gases can be stored in a pressure vessel 51. From the vessel 51 they can be vaporized for reuse in a system or they can be stored as a liquid for use at another time or location and used or sold as a commodity chemical. FIG. 2 also discloses monitoring systems in the form of a photo-ionization detector PID 52 and a gas detector 53, e.g. flame ionization detector (FID) residual gas analyzer, or Fourier transform infrared gas analyzer, which provide information to monitor the system and confirm that it meets process/environmental requirements. The PID 52 can also provide feedback to the supply/controller 43 to permit calibration and set-point adjustment.

Figure 3:
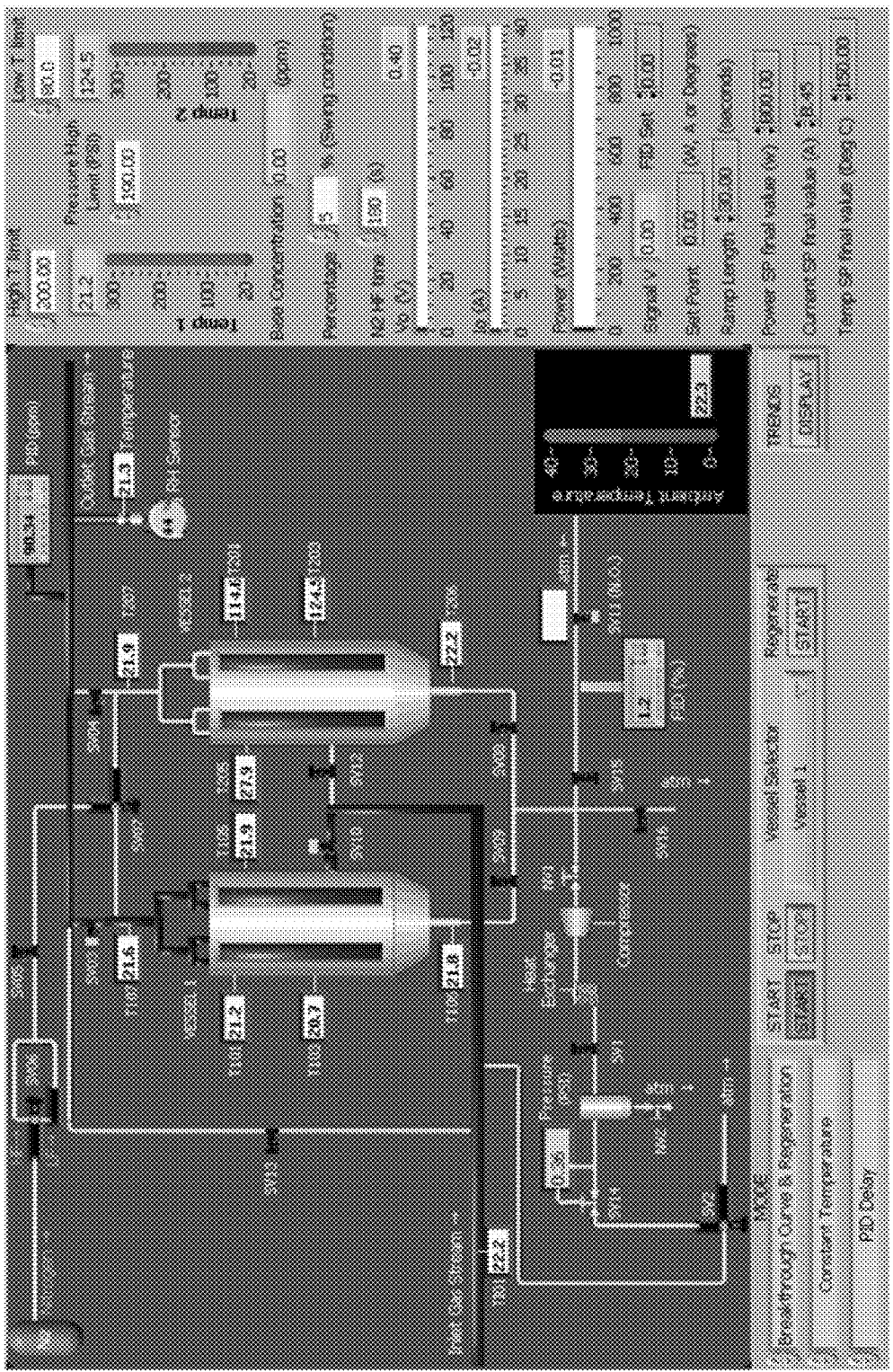
FIG. 3 illustrates a preferred embodiment controller user interface for the system of FIG. 2.

The system of FIG. 2 can operate automatically after initialization. FIG. 3 illustrates a preferred interface for a system of FIG. 2. The interface illustrated in FIG. 3 graphically represents a set of input parameters that a user can enter, e.g., breakthrough concentration, high and low temperature limits for the ACFC and degree of regeneration in Table 2.

TABLE 2

USER PARAMETERS

| Parameter | Function |
|---|---|
| Purge Cycle Duration | |
| Adsorption Cycle Set-Points: | |
| Maximum adsorption temperature | Temperature limit of ACFC at which gas stream can enter vessel |
| Inlet organic gas concentration | Organic gas concentration during adsorption |
| Breakthrough swing percentage | Organic gas concentration at adsorption vessel exhaust as a percentage of the organic gas concentration at the inlet of the adsorption vessel |
| Regeneration Cycle Set-Points: | |
| Inert gas purge time | Time for $N_2$ to purge vessel before heating can occur. |
| ACFC/Vessel set-point temperature | Desorption heating set-point |
| Controller ramp time | Time for controller to initially increase to maximum voltage |
| Compressor activation concentration. | Minimum gas concentration of exhaust from desorption vessel in which compressor is activated. |
| Minimum heating concentration | Minimum desorption vessel exhaust concentration in which ACFC is heated |
| Temperature and pressure of liquid recovery vessel | Pressure and temperature set-points for liquid recovery vessel |

The interface of FIG. 3 also provides status information on the system, including temperature, concentration, current, voltage, power readings, and set point information. In graphic interface shown in FIG. 3, an adsorption operation is being conducted by vessel 1. The data acquisition and control system requires a set of input parameters and then automates the adsorption mode, desorption mode, and the resulting liquid recovery of the organic gas. All system components for both vessels are computer controlled so that continuous capture and recovery can be achieved without operator intervention.

Figure 4:
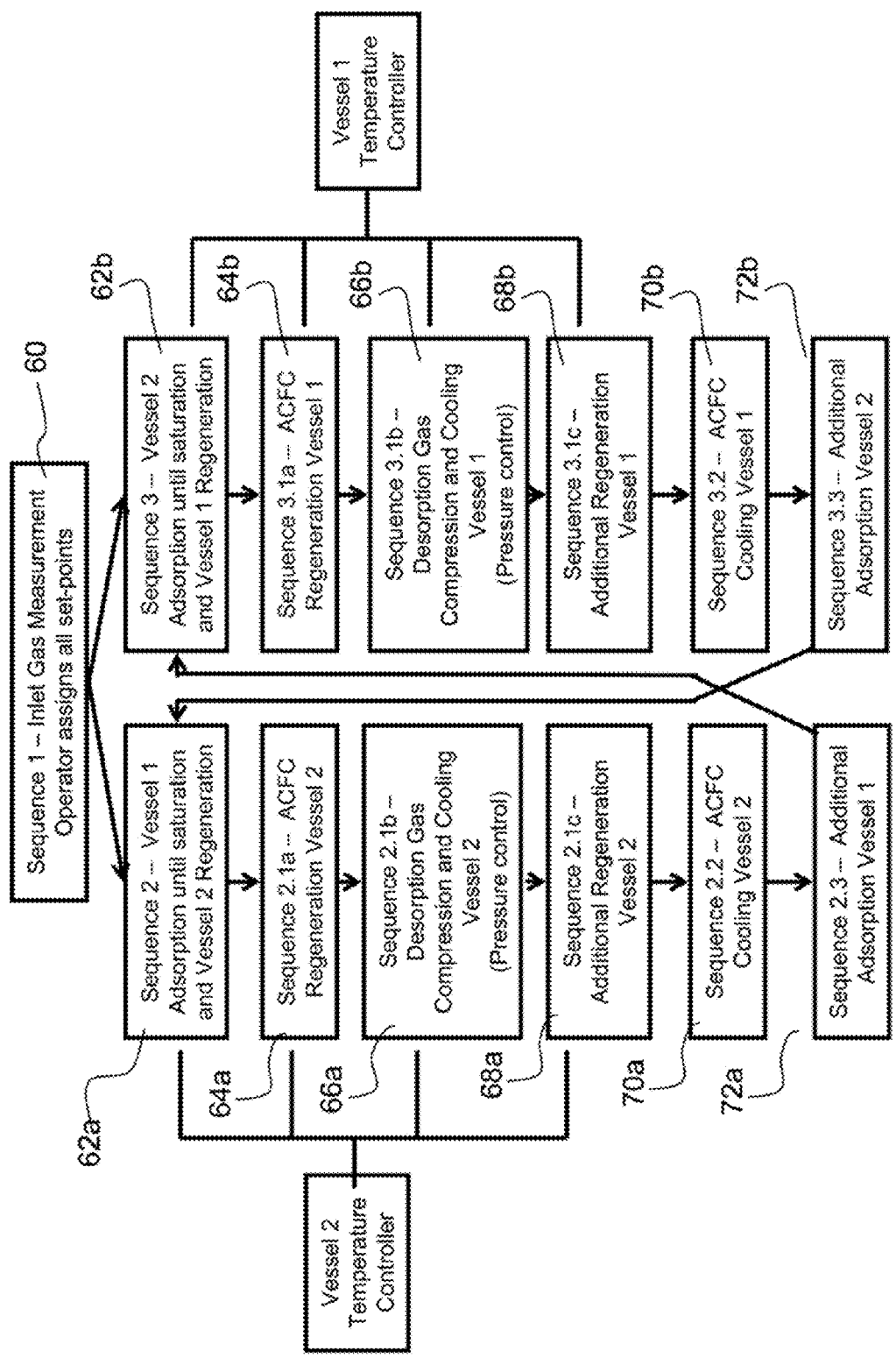
FIG. 4 shows a flow chart of a preferred general control method for the FIG. 2 and FIG. 3 system.

FIG. 4 shows a flow chart of a preferred general method for operation of the FIG. 2 and FIG. 3 system. In FIG. 4, a first sequence, sequence 1 is activated by a user. Preferably, this first sequence starts with a brief waiting period to ensure the correct inlet concentration is reached. After the brief waiting period, a cycling button appears in the graphical user interface of FIG. 3. During sequence 1, the operator selects the parameter values (set-points) needed. Once the adsorption vessel outlet concentration has stabilized at the desired base concentration, the operator can initiate operation by pressing the cycle button in the control interface of FIG. 3.

In sequence 2, vessel 1 40a conducts adsorption and vessel 2 40b conducts regeneration. Sequence 2 initializes 62a an adsorption cycle in vessel 1 40a and high $N_2$ flow into vessel 2 40b. The purpose of the high flow $N_2$ is to purge vessel 2 40b of other gases that have the potential to ignite while the vessel is heating. The duration of this segment can be one of the parameters the operator defines in sequence 1. In preferred embodiments, the controller program conducts the purge sequence for a minimum duration that is long enough to allow for a volume of $N_2$ to be at least two times as large as the vessel volume to adequately purge $O_2$ from the vessel. For example, for a 3,000 L vessel, at least 6,000 L of $N_2$ should flow through the vessel during the purge cycle. In a bench scale test system having 3 L vessels constructed in accordance with FIG. 2, a purge cycle default value was 3 minutes with a $N_2$ flow rate of 5 LPM, which allowed for 15 L of $N_2$. This factor of 5 displacement exceeded the preferred minimum safety factor of 9 L for the 3 L vessel.

In sequence 2.1a, vessel 2 is heated for regeneration 64a while vessel 1 continues adsorption. The control program controls the power supply to heat the ACFC 42b in vessel 2 40b. The control program achieves and maintains a set point for regeneration. The set point is selected in the interface by an operator, though the interface can limit the selection range to an appropriate set of values based upon system limitations and the temperature required for regeneration. In preferred embodiments, including the example bench scale test system, the power is controlled with an operator selected feedback controller through the interface and with a silicon controlled rectifier (SCR) to heat the ACFC 42b to the set-point temperature and then maintain the temperature. A ramp can be activated to avoid initial spikes in power. In the experimental bench scale system, the default desorption set-point temperature ranges between 200 and 250° C. and the default ramp set-point is 30 seconds. Both set-points can be changed by the operator during sequence 1.

Feedback controllers can overshoot the desorption set-point temperature value before stabilizing, so the control program also preferably accepts through the interface an operator defined maximum temperature. If this temperature is exceeded during the regeneration cycle, then power from the SCR that is applied to the ACFC is reduced to allow for cooling. This is a safety precaution to protect the ACFC. The default maximum temperature set-point in the bench scale system is 300° C., which is a preferred value to protect ACFC cloth.

To maximize output concentration of low boiling point gases, e.g., isobutane in the bench scale test, and to minimize $N_2$ usage, the $N_2$ flow rate is changed to low flow during the desorption cycle. The low flow rate is preferably a flow rate that is a small fraction of the volume of the vessel per minute. With the low flow less energy is needed for compression/condensation, and the equipment used for the compression/condensation can be smaller than would be required for a large flow. For example, the default $N_2$ low flow rate in the bench scale system that had a 3 L vessel is 0.5 LPM. The interface permits adjustment of this value when the system is off-line.

The operator can also define a minimum compressor set-point value for the low boiling point gas or gases being recovered by the system in the compression/condensation loop including compressor 49, condenser 50. This is measured by the gas detection device 53 (e.g., FID, residual gas analyzer, or Fourier transform infrared analyzer). As an example, a default set-point concentration is 20% by volume and can be changed at any time during the adsorption/desorption cycle. As long as this concentration is less than the set-point concentration, then the desorption gas will be recycled back to the vessel undergoing an adsorption cycle for adsorption through valves 41. Once the set-point concentration is reached then sequence 2.1.a is complete. If vessel 2 40b has not conducted an adsorption cycle, then the concentration measured by the FID will never reach the compressor set-point value. In this case the controller can automatically set the compressor set-point concentration to 0%, which is an effective by-pass of sequences 2.1a-2.2 and allows an adsorption cycle to be conducted. In an alternative process, both vessels 40a, 40b could operate in the same mode for batch operations. The device would need to be modified to capture the gas that is emitted from the liquid reservoir. Another option is to have two vessels experiencing adsorption cycles and a third vessel experiencing a desorption cycle.

Once the desorption concentration reaches the set point then sequence 2.1b begins the compression 66a and cooling of the desorption gas stream from vessel 2 40b by compressor 49 and heat exchanger 50, respectively. Vessel 1 40a continues the adsorption cycle and the concentrated desorbed gas from vessel 2 is compressed by the compressor 49, cooled by the heat exchanger 50, and condensed and collected as a liquid in the high pressure vessel 51. During sequence 1, the operator defines, within system limits, the maximum allowable pressure in the high pressure vessel 51. The maximum pressure permissible is a function of the compressor design and the pressure rating of the pressure vessel, valves surrounding the pressure vessel, and the heat exchanger. In the bench scale system that was tested, a default maximum pressure value was 190 psig (1,310 kPa). Once the maximum pressure value is reached a downstream valve 54 is opened by the control program to release pressure. The high pressure vessel 51 should also include a safety valve that limits the pressure to a safe level given the construction of the vessel. In the bench scale test system, a safety valve prevented pressure in the liquid reservoir from exceeding 200 psig (1,379 kPa), which is the safety limit for the pressurized liquid reservoir that was used in the bench scale system. Sequence 2.1b continues until the desorbed gas stream drops below the compressor set-point concentration value. The high concentration isobutane in experiments falls under a relatively smooth curve, so the compressor can be turned off as soon as the concentration falls below the set-point. In other instances, some margin around the set-point might be used to avoid rapid swings. The control program conducts 68a sequence 2.1c after the low boiling point gas concentration in the compressed gas loop concentration drops the predetermined level below the compressor's set-point concentration during the desorption cycle. During this stage vessel 1 continues the adsorption cycle and the desorbed gas from vessel 2 is recycled to vessel 1 for adsorption. The controller controls the power source 43 to continue to heat the ACFC, and the compressor 49 is deactivated. A heating concentration set-point (the minimum allowable low boiling point gas concentration during the desorption cycle for power to be applied to heat the ACFC) is eventually reached and the controller 20 stops heating the ACFC after the set point has been reached for a predetermined period. In the bench scale system, the set point for isobutane concentration during the desorption cycle had a default value of 6.5% by volume and the controller ended the desorption sequence once the HD sensor provided a concentration below that level for >40 seconds to complete sequence 2.1c. It is noted that deactivation of the compressor 49 temporarily drops the desorption concentration to 0%, so that it is desirable to have a reasonable delay before ending desorption.

Sequence 2.2 is run 70a by the control program to permit cooling of the ACFC of vessel 2 40b after the regeneration sequence. Vessel 1 40a continues the adsorption cycle and vessel 2 40b enters a standby cooling cycle. The controller turns off the power supply 43 to allow the cooling of the ACFC in vessel 2 40b. Low flow $N_2$ optionally flows through vessel 2 40b, which aids cooling of the ACFC. The cooling process continues until a set point for the maximum absorption cycle temperature is reached. The maximum absorption temperature should be set at a safe level that avoids ignition and allows for sufficient adsorption capacity of the ACFC when an adsorption cycle begins. In the bench scale system that was being tested for capture and recover of isobutane, the default maximum adsorption value temperature was set between 60 and 80° C. Once the ACFC reaches the maximum adsorption temperature, sequence 2.2 is complete.

The control program conducts 72a sequence 2.3 of additional adsorption with Vessel 1 40a while vessel 2 stays in a neutral state until a breakthrough percentage of the low boiling point gas is detected by the gas detector (e.g., PID). The breakthrough set point can be set by an operator. In the bench scale system, the default breakthrough percentage for the adsorption vessel's outlet isobutane concentration was based on 5% of the adsorption vessel's inlet isobutane concentration (e.g., 100 ppm, outlet concentration for a 2,000 ppm, inlet concentration). The sequence 2.3 is completed once breakthrough has been exceeded for a predetermined period. In the bench scale system a period of 5 seconds was used. Once the adsorption vessel's outlet gas stream reaches the breakthrough percentage sequence 2.3 is complete. Completion of sequence 2.3 starts sequence 3.

Sequence 3 through sequence 3.3 are the same as the sequences 2-2.3, only that the absorption and regeneration is switched with vessel 2 40b conducting adsorption and vessel 1 40a conducting regeneration. The automated cycles continue until an operator intervenes by activating a stop via the user interface or an alarm is activated. Safety systems monitor temperature and pressure, and the controller provides a warning and responds with a shut down upon the activation of an alarm.

Test results for the bench scale system will now be provided. Artisans will recognize the scalability of the system. The bench scale system demonstrates effective and efficient capture and liquefaction of a low boiling point organic gas, which was isobutane.

Bench Scale Test System Results

A bench-scale system in accordance with FIGS. 2-4 was tested with isobutane, a typical organic gas to determine adsorption capacity and post-desorption concentration ratio for isobutane (outlet concentration during desorption cycle divided by inlet concentration during adsorption cycle). With the concentration ratio provided by the invention, condensation of isobutane was possible with secondary treatment. Liquefying the organic gases was made possible with a combination of pressure and temperature control of the gas stream generated during the desorption cycles. The fraction of organic gas in the desorption stream that can be condensed is a function of pressure and temperature. For isobutane, a 10-fold increase in pressure coupled with a reduction in temperature to 0° C. theoretically results in condensation of 62% of the desorbed isobutane, whereas a temperature reduction to −10° C. results in 74% of the desorbed isobutane condensing. The laboratory results for the fraction of condensed isobutane as a function of controlled pressure and temperature will be presented. The components of the bench scale system corresponding to FIG. 2 and the operation parameters and results will now be discussed.

Gas Generation System

The gas generation system produces a feed gas of dry, filtered air with a controlled amount of organic gas. Pressurized house air is passed through a HEPA particulate matter filter and then through a bed of silica gel to ensure it is dry and free of particulate matter. The air stream is then passed through a mass flow controller and mixed with the organic gas stream. The organic gas is obtained from a pressurized cylinder and is also controlled with a mass flow controller.

ACFC Adsorbers with Electrothermal Regeneration Capability

The adsorption/desorption vessels were each 3.5 L and held two annular cartridges, each with 91.5 grams of activated carbon fiber cloth (ACFC, Kynol ACC5092-15). Temperature was monitored in the cloth and on the vessel walls using Type K thermocouples. Power application to the cloth was controlled with a SCR, which provided heating to the cloth via Joule heating. The power application was monitored and controlled via National Instruments hardware and software.

Post-Desorption Gas Treatment System

A gas compressor (Air Dimensions, Inc., R272-BT-EA1) was used to provide compression of the desorption gas stream up to 190 psig. This compressor was followed by copper tubing, which acted as a heat exchanger with the ambient environment. Finally, a polycarbonate pressure vessel located in a controlled temperature bath stored the organic gas/liquid at high pressure and reduced temperature. The temperature in the vessel is controlled by the temperature of the fluid surrounding the pressure vessel and the pressure in the vessel is controlled via the control program, which opens a solenoid valve when the pressure in the pressure vessel is above the user-defined maximum pressure and closes the valve when the pressure in the pressure vessel is below the user-defined maximum.

Gas Detection Devices

Two gas concentration detection devices were used with this system. The first is a photo-ionization detector (PID, RAE Systems, Inc., PDM-10A) used to detect the organic gas during adsorption in concentrations ranges between 0 and 5,000 ppmv. The second device is a flame ionization detector (FID, MSA Inc., Series 8800) used to detect organic gas during desorption in concentration ranges between 0 and 100% by volume. The PID was calibrated using house air generated as described above as the zero and then house air containing various concentrations of organic gas that ranged from 0 to 5,000 ppmv. The FID was calibrated using $N_2$ at 0.5 SLPM as the zero and mixtures of organic gas and $N_2$ with a total flow of 0.5 SLPM and concentrations between 20 and 100% by volume organic gas.

System Control and Data Acquisition Device

The bench scale system was fully automated and required no operator-intervention. The control system utilized National Instruments Fieldpoint™ hardware connected to a personal computer with Lab View 6.1 software. The control system monitored and logged gas concentrations, cloth temperatures, and power output. Additionally, the control system determined when an adsorption vessel is saturated based on user defined parameters and automatically switches that vessel to desorption mode while simultaneously beginning adsorption on the other vessel in the system. This strategy ensures that the organic gas/air stream is constantly being captured via adsorption.

Experimental Methods

A series of experiments was run to improve the operating conditions to achieve condensation of the organic gas post-desorption. For each experiment, isobutane was used as the model organic gas.

Operating Conditions

The operating conditions tested on the system described above are shown in Table 1. The gas concentration during adsorption and desorption was monitored during each test and visual observations were made to determine if liquid isobutane formed in the pressure vessel.

TABLE 2

OPERATING CONDITIONS FOR CAPTURE AND RECOVERY OF ORGANIC GASES FOR REUSE

| Operating Parameter | Condition |
|---|---|
| Inlet Air Flow Rate (SLPM) | 100 |
| Isobutane Inlet Concentration (ppm$_v$) | 2,000 |
| Nitrogen Flow Rate During Desorption (SLPM) | 0.5 |
| Pressure Vessel Volume (L) | 4.5 |
| Maximum ACFC Temperature During Desorption (° C.) | 225 |

The inlet air flow rate remained constant for all tests, but each of the other operating conditions was tested at different levels to determine their effect on the desorbed gas concentration.

Results and Discussion

Figures 5A, 5B:
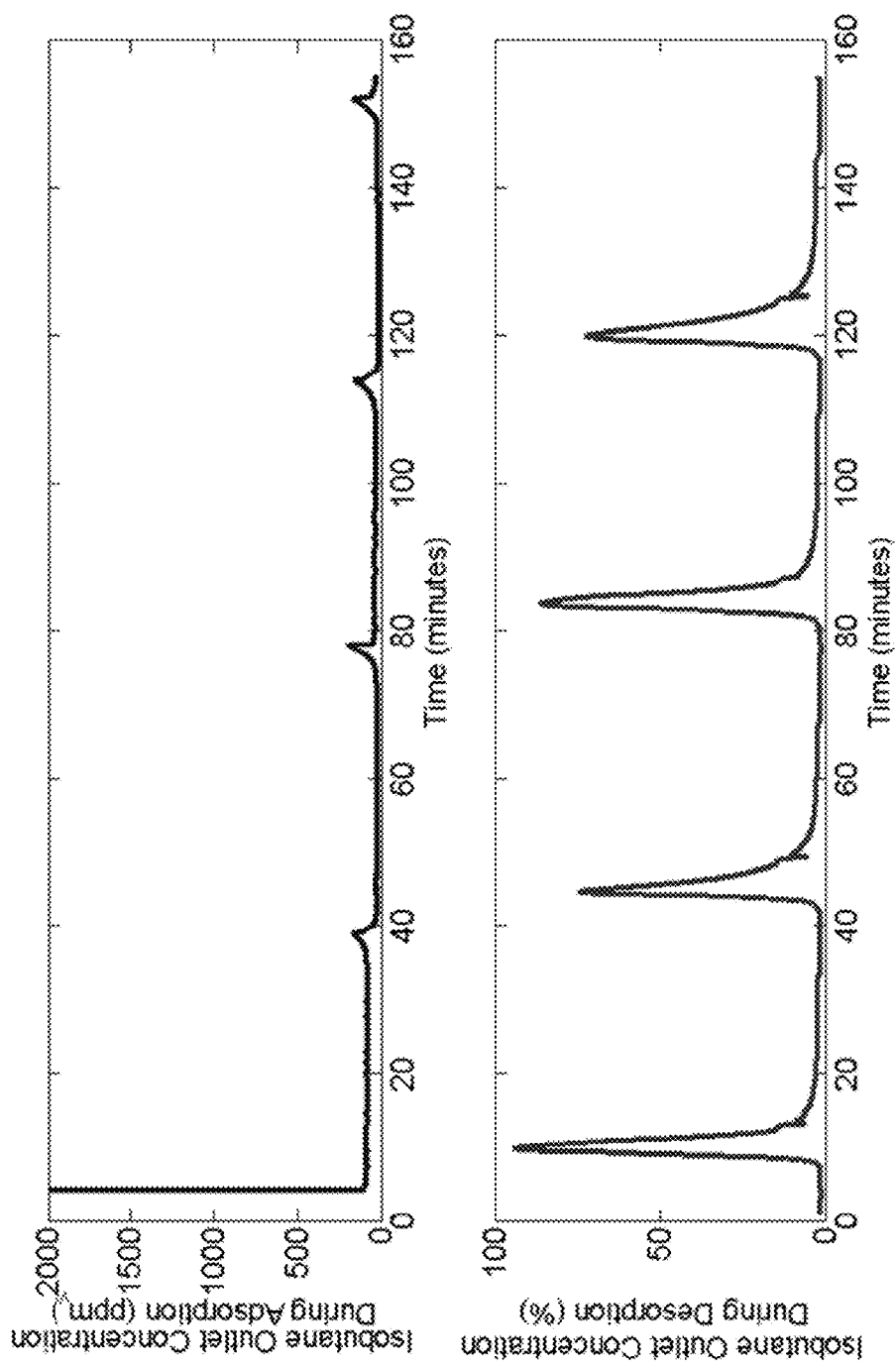
FIG. 5A & 5B show results of adsorption cycles and desorption cycles, respectively, for an experimental bench scale system of the invention to concentrate isobutane.

Results from the adsorption/desorption cycles with the preliminary operating parameters listed in Table 1 are shown in FIGS. 5A and 5B. These figures show adsorption (FIG. 5A) and desorption (FIG. 5B) outlet concentrations of isobutane during cycling. Adsorption inlet conditions: 100 SLPM dry air with 2,000 ppmv isobutane. Desorption conditions: 0.5 SLPM $N_2$, maximum ACFC temperature 225° C. The average capture efficiency for isobutane during adsorption for this experiment was >98%. The peak and average isobutane concentrations at the vessel's outlet during desorption were 94% and 40% by volume, respectively, resulting in a gas phase concentration ratio of the inlet gas stream concentration during adsorption cycles to the outlet gas stream concentration during desorption cycles of 470 to 1 and 200 to 1, respectively. Additionally, because liquid isobutane was produced providing >99% isobutane, the ratio of the inlet gas stream concentration during adsorption cycles to the outlet gas stream concentration during desorption cycles for the post-desorption gas treatment system was >495 to 1.

The desorption stream was compressed to 180 psig (12.4 bar-gauge) and is cooled. Tests have occurred as low as −5° C., but lower temperatures are readily possible. Because the resulting desorption stream had a higher average concentration than the minimum required for condensation at standard temperature (29-39%), condensation of isobutane was achieved. Condensation of the gas can also occur by cooling with or without compression. This observed condensation is proof of the ability for the recovery of a dilute organic gas as a liquid for reuse using ACFC, electrothermal desorption, and condensation. Liquefied isobutane was captured in the polycarbonate pressure vessel.

Temperature Control of ACFC during Desorption

The gas recovery system uses electrothermal heating to regenerate the ACFC. Control of ACFC heating allows for high isobutane concentrations during desorption. Feedback control is used to maintain specified temperatures for heating the ACFC during desorption, allows for stable power application, and lowers the total power needed to regenerate the ACFC.

The experiments show an embodiment of the invention that a fully automated, dual vessel adsorption with electrothermal desorption and condensation system was developed for capture and recovery of organic gases. This system recovered the concentrated organic gas as a liquid and provided a purified carrier gas stream for reuse or emission to the atmosphere. The average concentration ratios obtained during desorption and then condensations were 200 to 1 and >495 to 1, respectively. Temperature of the cloth during desorption can be controlled via several control schemes including a feedback loop based on the electrical resistance of the adsorbent.

Preferred Feedback Control Method

A system of the invention can offer multiple control options through the user interface of FIG. 3. Preferably, the system offers options of on-off controller, proportional-integral-derivative controller (P-I-D), a proportional-integral-derivative delay (P-I-D delay) controller, and a P-I-D delay control method with secondary P-I-D control. The controllers send a DC signal voltage (0-5 V dc) to the SCR which determines the ac voltage sent to the ACFC 14. Accurate feedback control of ACFC heating allows for efficient recovery of high isobutane concentrations during desorption. Feedback control is used to maintain specified temperatures for heating the ACFC during desorption, allows for stable power application, and lowers the total power needed to regenerate the ACFC. The operator can select the controller 20 to maintain constant temperature (default), resistance, current, or power. Feedback control allows for stable power application and lowers the total power needed to regenerate the ACFC.

Any of the on-off, proportional-integral-derivative (P-I-D), P-I-D delay, and P-I-D delay with secondary P-I-D controller algorithms embodied in the controller send a dc signal voltage to the SCR which determines the ac voltage applied to the ACFC. The fourth controller combines the P-I-D delay controller with a secondary P-I-D controller that adjusts the maximum SCR signal voltage (MSSV) to the ACFC to keep the current below 30 A to avoid damaging the data acquisition equipment. This secondary controller is only activated for the constant temperature and constant resistance modes. The maximum voltage to the SCR for constant current and constant power modes is 5 V dc.

Figure 6:
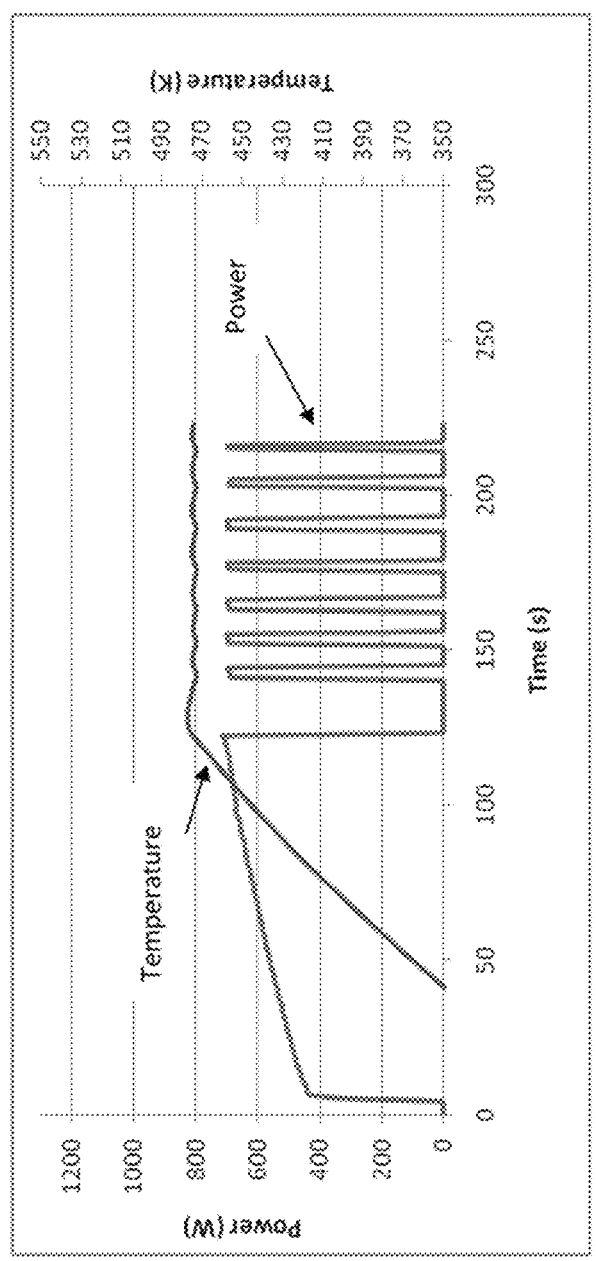
FIG. 6 illustrates a temperature profile for heating of ACFC in the bench scale system using an on-off control method.

The on-off controller of the bench scale system sends a signal voltage of 5 V dc to the SCR for heating the ACFC when the ACFC temperature is lower than the set point temperature, and does not send a signal voltage when the ACFC temperature is higher than the set point temperature. FIG. 6 shows the temperature and power profile of the ACFC cloth during heating from 351 K (78° C.) to 473 K (200° C.) with the on/off control method.

Table 3 contains control properties for the on-off controller. Benefits of this controller include fast settling time of 69 seconds with a small overshoot of 1.9%, which results in a small average absolute error (AAE) (Equation 1) between actual recorded and set-point temperatures of of 0.26. There are two major trade-offs for the on-off controller. A large quantity of energy is needed for heating, 62 kJ, and there are large spikes in power, >600 W, which can reduce the lifetime of the data acquisition equipment.

$$AAE = \frac{100}{n} \sum_{i=1}^{n} \frac{|x_i - x_{sp}|}{x_{sp}} \quad \text{(Equation 1)}$$

where:
$x_i$: recorded temperature (° C.)
$x_{sp}$: set-point temperature (° C.)
n: number of data points

TABLE 3

| Controller | On-Off |
|---|---|
| Initial Temperature (K) | 351 |
| Set-point (K) | 473 |
| Rise Time (s) | 62 |
| Settling Time (s) | 69 |
| Overshoot (%) | 1.9 |
| Energy (kJ) | 62 |
| AAE (%) | 0.26 |
| Max Power (W) | 713 |

In the table, rise time is the time for the ACFC to heat from 10% to 90% of the set-point. Settling time is the time for the ACFC temperature to reach and stabilize within 4% of the set-point while heating from the initial temperature. Overshoot is the percent difference between the maximum actual temperature and the set-point temperature. Energy is the total energy usage for heating until 60 seconds after the set-point is reached. AAE is the average percent difference between the actual temperature and the set-point temperature from the time when the ACFC first reaches the set-point until 60 seconds after reaching the set-point.

Figure 7:
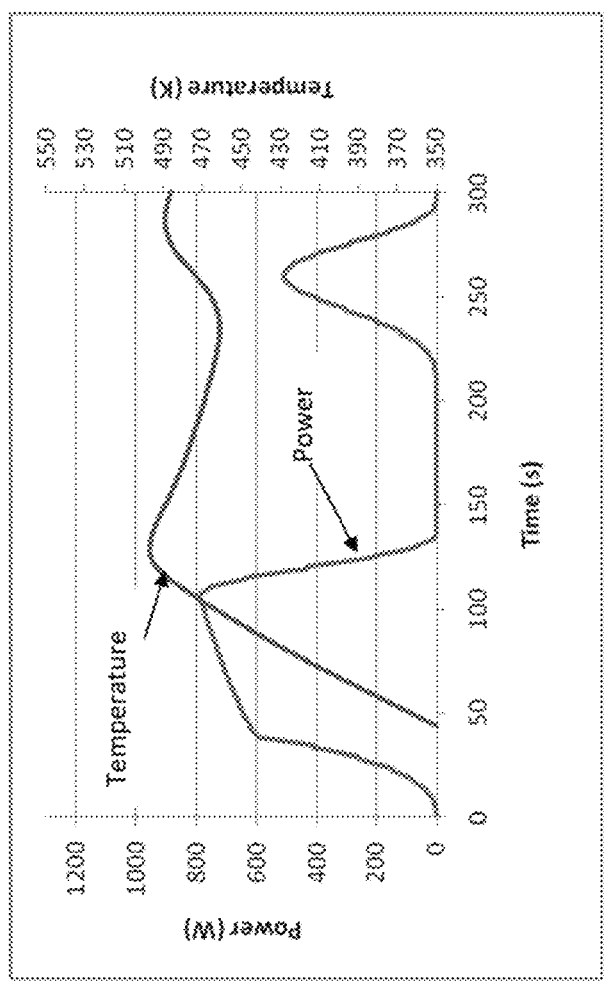
FIG. 7 illustrates a temperature profile for heating of ACFC in the bench scale system using a P-I-D control method.

The P-I-D controller sends an analog signal voltage between 0 and 5 V dc to the SCR for heating the ACFC. FIG. 7 shows the temperature of the ACFC and the power applied to the ACFC during heating from 351 K (78° C.) to 473 K (200° C.) for the P-I-D controller, which was tuned with the Ziegler-Nichols method and then manual adjustments were made for improved control for ACFC heating. Table 4 contains the parameters and constants used for the P-I-D controller.

TABLE 4

| Parameters | Constants |
|---|---|
| Proportional | 0.35 |
| Integral | 0.30 |
| Derivative | 0.05 |

Is Table 5 contains control properties for the P-I-D controller. Benefits of the P-I-D controller over the on-off controller include 56 kJ of energy usage compared to 62 kJ of energy usage for the on-off controller and more gradual changes in power. Trade-offs for the P-I-D include slower settling time, with a larger overshoot, and a larger AAE of 97 seconds, 5.1%, and 3.51%, respectively.

TABLE 5

| Controller | P-I-D |
|---|---|
| Initial Temperature (K) | 351 |
| Set-point (K) | 473 |
| Rise Time (s) | 50 |
| Settling Time (s) | 97 |
| Overshoot (%) | 5.1 |
| Energy (kJ) | 56 |
| AAE (%) | 3.51 |
| Max Power (W) | 790 |

Figure 8:
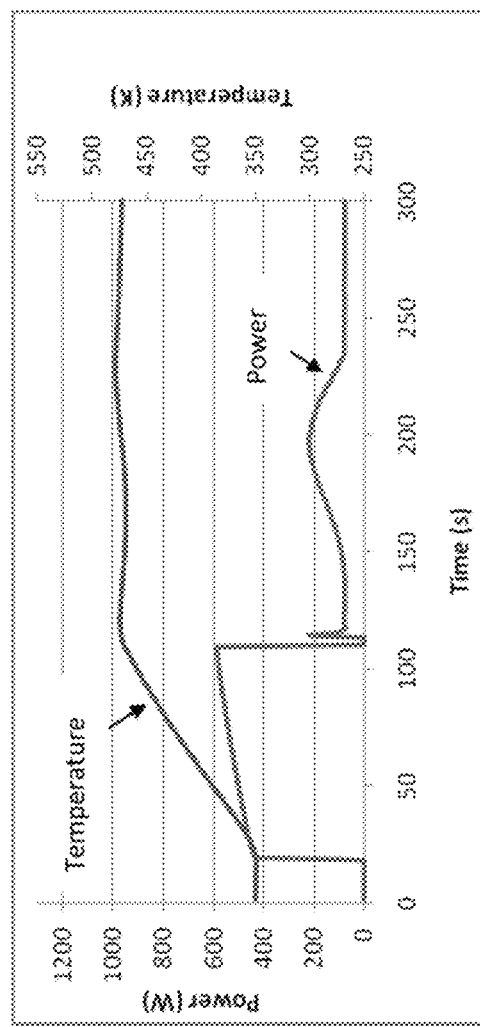
FIG. 8 illustrates a temperature profile for heating of ACFC in the bench scale system using a P-I-D delay control method.

The P-I-D delay controller sends 5 V dc to the SCR until the ACFC is within 4 K of the set-point temperature. Once the ACFC is within 4 K of the set-point temperature, the P-I-D controller is activated sending an analog signal between 2.2 and 3.5 V dc. FIG. 8 shows the temperature of the ACFC and the power applied to the ACFC during heating from 351 K (78° C.) to 473 K (200° C.). The P-I-D for the P-I-D delay controller was tuned manually for ACFC heating. Table 6 contains the constants used for the P-I-D delay controller.

TABLE 6

| Controller | Constants |
|---|---|
| Proportional | 0.40 |
| Integral | 0.80 |
| Derivative | 0.50 |

For heating ACFC, the P-I-D delay controller has multiple benefits over both the on-off and P-I-D controllers. The P-I-D delay controller has less overshoot, and a smaller AAE value of 1.2%, and 0.41% respectively. The energy usage for heating is also smaller at 53 kJ. The major trade-off for a P-I-D delay controller is the initial spike in power which has the potential to damage equipment.

TABLE 7

| Controller | P-I-D Delay |
|---|---|
| Initial Temperature (K) | 351 |
| Set-point (K) | 473 |
| Rise Time (s) | 69 |
| Settling Time (s) | 95 |
| Overshoot (%) | 1.2 |
| Energy (kJ) | 53 |
| AAE (%) | 0.41 |
| Max Power (W) | 591 |

Secondary P-I-D control of current can also be implemented.

Since temperature of the ACFC is controlled by maintaining voltage, a decrease in resistance results in an increase of current and power (Equation 3 and 4).

$$V = Ir \quad \text{(Equation 2)}$$

where:
V: Root mean square voltage (V),
I: Root mean square current (A),
r: Resistance (Ω)

$$P = IV \quad \text{(Equation 3)}$$

Where:
P: Power (W)

The maximum current that can be applied for desorption heating without damaging the equipment of the bench scale system was estimated to be 30 amps. To ensure that the 30 amp limit is not reached during heating, the controller must keep the applied power below the maximum when the ACFC's temperature is below the maximum allowable temperature. The secondary P-I-D reduces voltage to maintain a current ≦30 amps as temperature increases. This controller allows for an increase in power application at low temperatures, while maintaining the current below the 30 amp limit at high temperatures.

Figure 9:
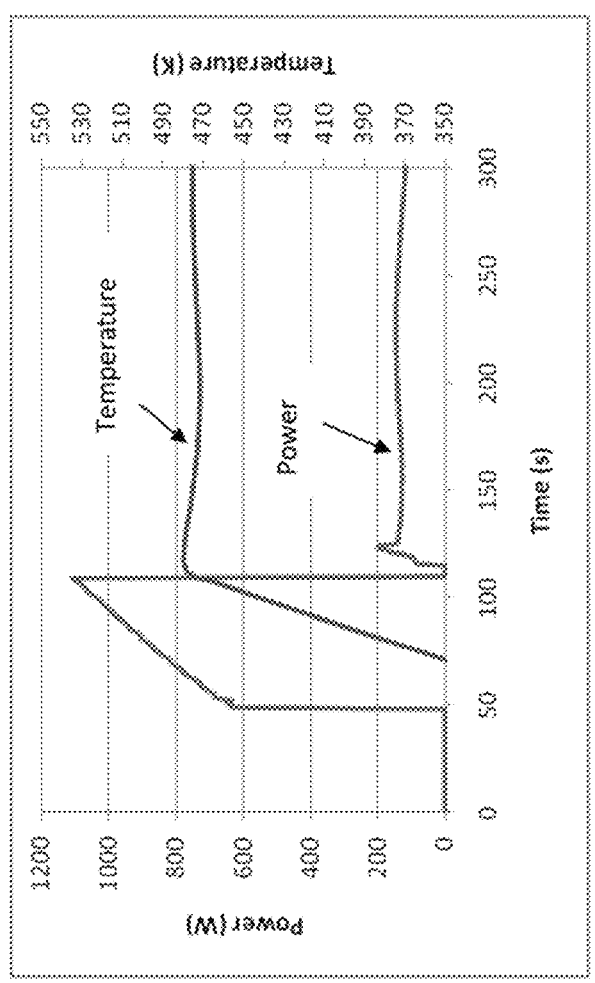
FIG. 9 illustrates a temperature profile for heating of ACFC in the bench scale system using a P-I-D delay control method with secondary P-I-D control for heating.

The secondary P-I-D controller was tested with the P-I-D delay controller because the P-I-D delay was the most beneficial for heating ACFC when compared to the on-off and P-I-D controllers. FIG. 9 shows the temperature of the ACFC and the power applied to the ACFC during heating from 351 K (78° C.) to 473 K (200° C.) with the P-I-D delay controller for temperature while also using the secondary P-I-D controller. Table 8 contains the constants used for the secondary P-I-D controller which were manually tuned so that current is maintained below 30 A.

TABLE 8

| Controller | Constants |
| --- | --- |
| Proportional | 0.2 |
| Integral | 0.00005 |
| Derivative | 0.05 |

FIG. 9 illustrates the power applied to the ACFC and the temperature of the ACFC for heating of ACFC with a P-I-D delay controller and secondary P-I-D for current control. The major benefits to using a secondary P-I-D controller for heating ACFC are the low rise time, settling time, and an overshoot of 31 seconds, 32 seconds, and 1.4% respectively. The energy usage for the P-I-D delay controller with a secondary P-I-D was less than the P-I-D delay controller, 44 kJ, and 53 kJ, respectively. The trade-offs for the secondary P-I-D controller include an increased maximum power of 1107 W which can potentially reduce the lifetime of the equipment, and an increase in AAE to 0.73% caused by the competition between the secondary P-I-D controller reducing voltage to maintain a current less than 30 A and the P-I-D delay which controls to maintain the temperature of the ACFC. Table 9 shows the responses for the heating of ACFC with P-I-D delay controller with secondary P-I-D for current control.

TABLE 9

| Controller | P-I-D delay controller with secondary P-I-D |
| --- | --- |
| Initial Temperature (K) | 351 |
| Set-point (K) | 473 |
| Rise Time (s) | 31 |
| Settling Time (s) | 32 |
| Overshoot (%) | 1.4 |
| Energy (kJ) | 44 |
| AAE (%) | 0.73 |
| Max Power (W) | 1,107 |

Table 10 includes a summary of the results from each temperature controller tested with the bench scale system. A summary of the strengths and weaknesses of each controller for the heating of ACFC is presented in Table 11. The P-I-D delay with a secondary P-I-D was the best controller for ACFC heating because it has the fastest rise and settling time with a lower total energy usage and AAE value of 31 seconds, 32 seconds, 44 kJ, and 0.73%, respectively.

TABLE 10

| Controller | On-Off | P-I-D | P-I-D Delay | P-I-D Delay with Secondary P-I-D |
| --- | --- | --- | --- | --- |
| Initial Temperature (K) | 351 | 351 | 351 | 351 |
| Set-point (K) | 473 | 473 | 473 | 473 |
| Rise Time (s) | 62 | 50 | 69 | 31 |
| Settling Time (s) | 69 | 97 | 95 | 32 |
| Overshoot (%) | 1.9 | 5.1 | 1.2 | 1.4 |
| Energy (kJ) | 62 | 56 | 53 | 44 |
| AAE (%) | 0.26 | 3.51 | 0.41 | 0.73 |
| Max Power (W) | 713 | 790 | 591 | 1,109 |

The experimental controllers discussed above with respect to the bench scale system received a temperature input and controlled voltage to reach and maintain a set-point temperature. As has been mentioned, a resistance based controller can also be used. A resistance based controller was developed and tested to receive both current and voltage inputs and control voltage to reach and maintain a set-point temperature. The resistance based controller first converts the current and voltage inputs to resistance using equation 3. Resistance is then converted to temperature based on an empirical correlation derived through the measurement of resistance at a series of different temperatures. Based on 70 samples from the experiments, the polynomial relationship between resistance and temperature (r=0.000011 $T^2$-0.014953T+6.110362 where r=resistance ($\Omega$) and T=temperature (K)) has a correlation coefficient ($R^2$)>0.999 suggesting a strong correlation. The ACFC was heated to the gas recovery system's default desorption temperature for isobutane using a resistance based controller. The resistance readings were converted to temperature based on the polynomial relationship described above. Table 11 compares the resistance based P-I-D delay controller to the temperature based P-I-D delay controller for a set-point of 473 K (200° C.).

TABLE 11

| Controller Properties | Temperature Control based on Temperature | Temperature Control based on Resistance | Difference (%) |
| --- | --- | --- | --- |
| Initial Temperature (K) | 351 | 351 | — |
| Set-point (K) | 473 | 473 | — |
| Rise Time (s) | 69 | 57 | −17.4 |
| Settling Time (s) | 95 | 59 | −37.9 |
| Overshoot (%) | 1.2 | 1.2 | 0 |
| Energy (kJ) | 53 | 39 | −26.4 |
| AAE (%) | 0.41 | 0.32 | −22.0 |
| Max Power (W) | 591 | 514 | −13.0 |

The temperature and resistance input P-I-D delay controllers had values within 38% for all the controller properties listed in Table 11. The most significant difference between controllers was a 38.0% reduction in settling time with the resistance-based controller when compared to the temperature-based controller. The similarities between controller properties indicates that the resistance-based controller to achieve a specified temperature of ACFC is a feasible control option at the desorption temperature for isobutane of 473 K (200° C.). Resistance input control can also work for the on-off and P-I-D controllers. The major benefit of a resistance-based controller is that by directly measuring current and voltage it reduces the need for temperature sensors (e.g., thermocouples) attached to the adsorbent. Since these thermocouples are in contact with the ACFC during desorption they have the potential to provide incorrect values and carry current away from the ACFC if they are not in proper contact with the ACFC. Thermocouples can also lose contact with the ACFC through aging or maintenance operations.

Figure 10:
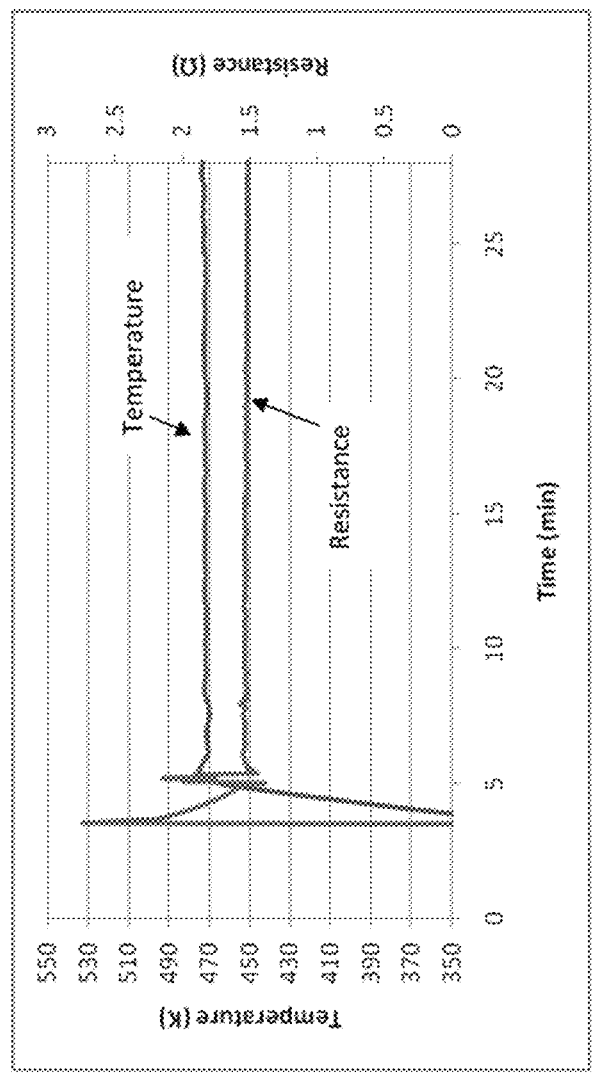
FIG. 10 illustrates a temperature profile for heating of ACFC in the bench scale system using a P-I-D delay control which utilizes resistance heating and monitoring.
Figure 11:
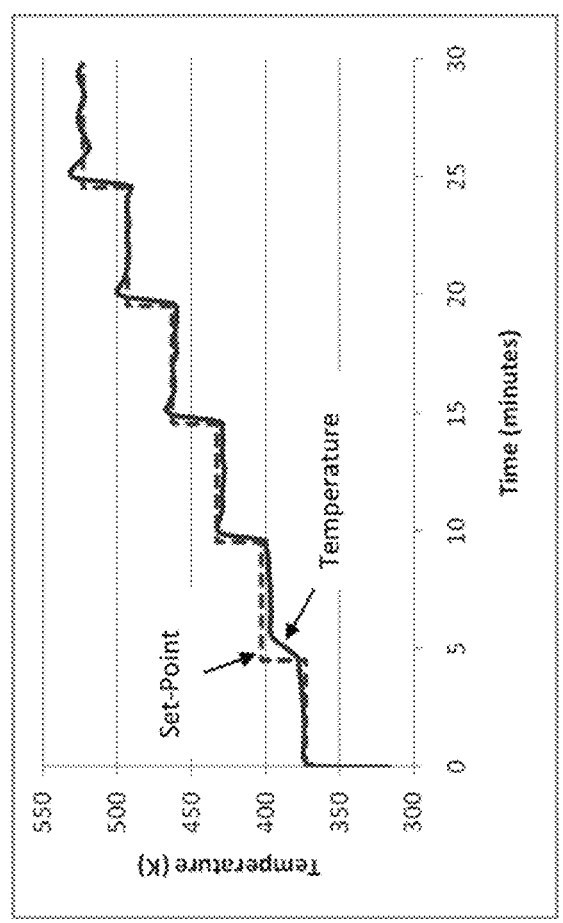
FIG. 11 illustrates resistance controlled heating of ACFC in the bench scale system over a range of different set-point temperatures with the resistance based wide range P-I-D delay controller.

The effectiveness of the P-I-D delay controller (temperature or resistance based) is dependent on the P-I-D activation temperature which is a minimum temperature that the ACFC must reach in order to activate P-I-D controlDuring initial heating of the ACFC, when the ACFC actual temperature is less than the activation temperature 5 V dc is sent to the SCR. Then as the ACFC is heated and the actual temperature surpasses the activation temperature a P-I-D controller is activated to control signal voltage to the SCR. FIG. 10 illustrates a temperature profile for heating of ACFC in the bench scale system using a P-I-D delay control which utilizes resistance heating and resistance-based control without the use of a secondary controller to maintain electrical current. FIG. 11 illustrates heating of ACFC in the bench scale system over a 150 K range with different set-point temperatures with the resistance-based wide range P-I-D delay controller. In FIG. 11, a series of temperatures were maintained by controlling resistance set-points. Each temperature from 373 K (100" C) to 523 K (250° C.) in increments of 30 K was maintained for five minutes. Table 12 shows the P-I-D activation temperature as a function of ACFC temperature set-point for the controllers utilized in FIG. 10 and FIG. 11.

Table 13 describes important control properties over a wide range of set-point temperatures.

TABLE 12

| P-I-D Property | P-I-D Delay (° C.) | Wide range P-I-D Delay (° C.) |
|---|---|---|
| Activation Temperature$^a$ (° C.) | $S^a$-4 | $1.107 * S^a$-30.17 |

$^a$S = set-point temperature for ACFC heating

TABLE 13

| Set-Point (K) | AAE (%) | Arithmetic Average Temperature (K) | Standard Deviation (K) |
|---|---|---|---|
| 373 | 0.58 | 375.2 | 1.23 |
| 403 | 1.34 | 397.6 | 0.98 |
| 433 | 0.82 | 429.5 | 1.09 |
| 463 | 0.40 | 462.0 | 1.80 |
| 493 | 0.27 | 494.0 | 2.13 |
| 523 | 0.50 | 524.8 | 2.90 |

The experiments demonstrated fully automated, dual vessel adsorption with desorption and condensation system that is scalable, and can be controlled to capture, liquefy and recovery low boiling point gases. This system recovered the concentrated organic gas as a liquid and provided a purified carrier gas stream for reuse or for emission to the atmosphere. The average concentration ratios of the inlet gas stream concentration during adsorption cycles determined upstream of the adsorption vessel to the outlet gas stream concentration during desorption cycles downstream of the desorption vessel and in the pressure vessel were 200:1 and >495:1, respectively, when condensation was observed.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A gas purification method for the recovery and liquefaction of low boiling point gases, the method comprising:
    accepting a gas stream including low boiling point gases;
    adsorbing low boiling point gases with a heated activated carbon fiber material during an adsorption cycle;
    during a desorption cycle flowing an inert gas through the activated carbon fiber and heating the activated carbon fiber to a desorption temperature to create a desorption gas stream with the low boiling point gases; and
    actively compressing and/or cooling the desorption gas stream to condense and liquefy the low boiling point gases.

2. The method of claim 1, further comprising a step of purging a vessel containing the activated carbon fiber material prior to the desorption cycle.

3. The method of claim 2, wherein said step of purging replaces at least 2 times the volume of the vessel prior to desorption cycle with a high flow of inert carrier gas.

4. The method of claim 3, wherein the inert gas flow is substantially reduced during the desorption cycle.

5. The method of claim 1, wherein said step of actively compressing and/or cooling is continued until the desorption gas stream reaches a set point for the low boiling point gases.

6. The method of claim 1, further comprising a step of collecting the low boiling point gases in a pressure vessel.

7. The method of claim 1, wherein the low boiling point gas comprises isobutane.

8. The method of claim 1, wherein said gas stream is received from a manufacturing processing plant.

9. The method of claim 1, wherein said desorption gas stream has volume flow that is a small fraction of the volume flow through the vessel during the adsorption cycle.

10. The method of claim 1, wherein the adsorption and desorption temperatures are maintained at selected set points with feedback control.

11. The method of claim 1, wherein the activated carbon fiber material is heated electrically and feedback control is used to control the temperature of the activated carbon fiber material based upon the resistance of the activated carbon fiber material and a polynomial relationship for the cloth that defines the relationship between its electrical resistance and its temperature.

12. The method of claim 11, wherein the feedback control comprises an on-off control.

13. The method of claim 11, wherein the feedback control comprises a proportional integral derivative feedback control.

14. The method of claim 11, wherein the feedback control comprises a proportional integral derivative delay feedback control.

15. The method of claim 11, wherein the feedback control comprises a proportional integral delay feedback control with a secondary proportional integral derivative feedback control.

16. The method of claim 1, further comprising a step of collecting the low boiling point gases.

17. The method of claim 1, wherein said step of actively compressing and/or cooling comprises actively compressing and cooling the desorption gas stream.

18. The method of claim 1, wherein said actively compressing and/or cooling is conducted on the desorption gas stream received from the activated carbon fiber material during the desorption cycle with the inert gas flow.

19. The method of claim 1, wherein said actively compressing and/or cooling is conducted on the desorption gas stream in a vessel where desorption is conducted.

* * * * *

UNITED STATES PATENT AND TRADEMARK OFFICE
CERTIFICATE OF CORRECTION

PATENT NO. : 8,500,853 B2
APPLICATION NO. : 12/827630
DATED : August 6, 2013
INVENTOR(S) : Rood et al.

It is certified that error appears in the above-identified patent and that said Letters Patent is hereby corrected as shown below:

In the Specification:

Col. 8, line 66    After "rapid swings.", please insert a paragraph break.

Col. 13, line 61   Before "Table 5", please delete "Is".

Signed and Sealed this
Twentieth Day of May, 2014

Michelle K. Lee
*Deputy Director of the United States Patent and Trademark Office*